July 24, 1951
A. W. SHAW ET AL
2,561,484
POWER-OPERATED PIPE CUTTING TOOL
Filed Aug. 23, 1949
2 Sheets—Sheet 1
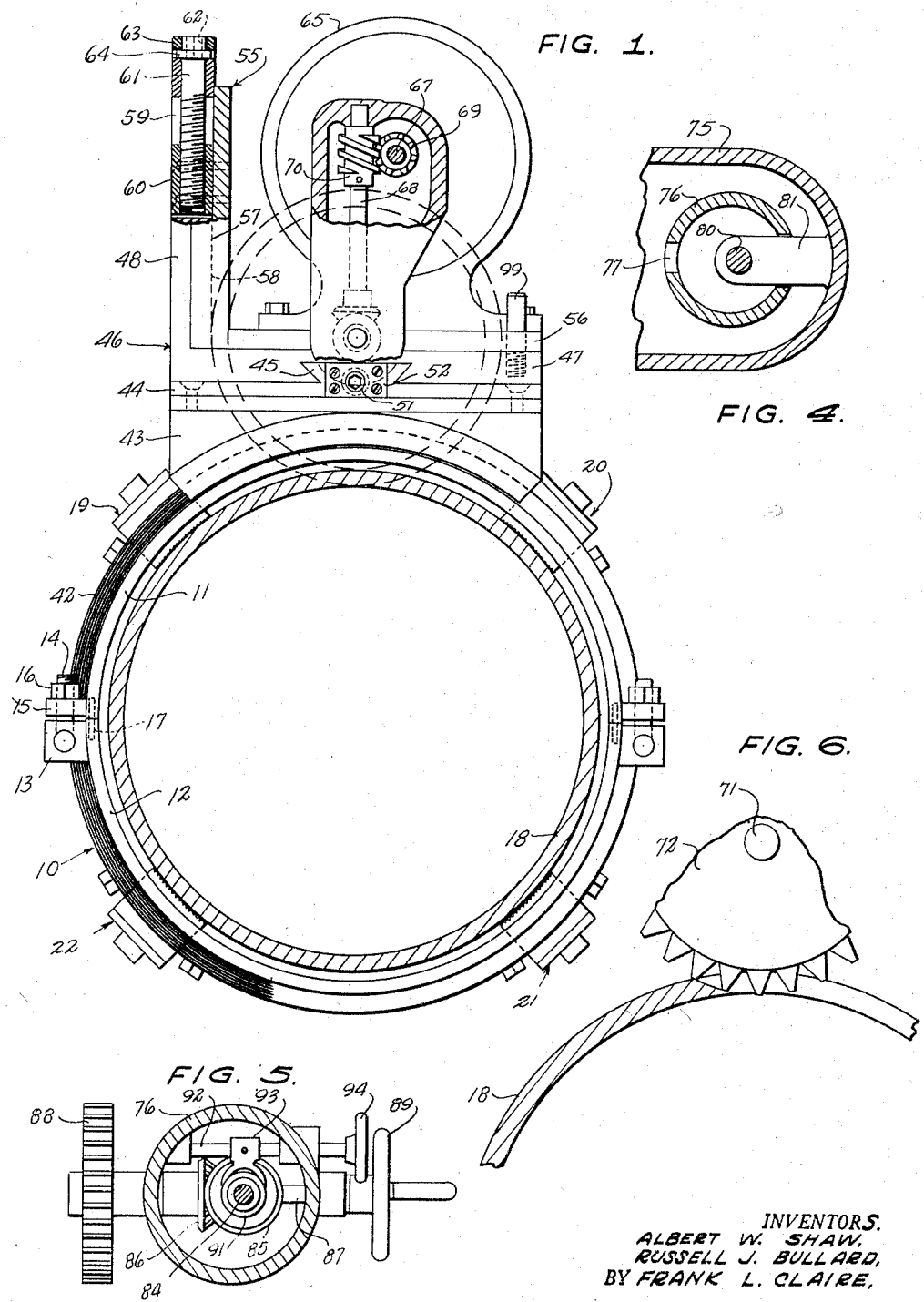
INVENTORS.
ALBERT W. SHAW,
RUSSELL J. BULLARD,
BY FRANK L. CLAIRE,
McMorrow, Berman & Davidson
ATTORNEYS.

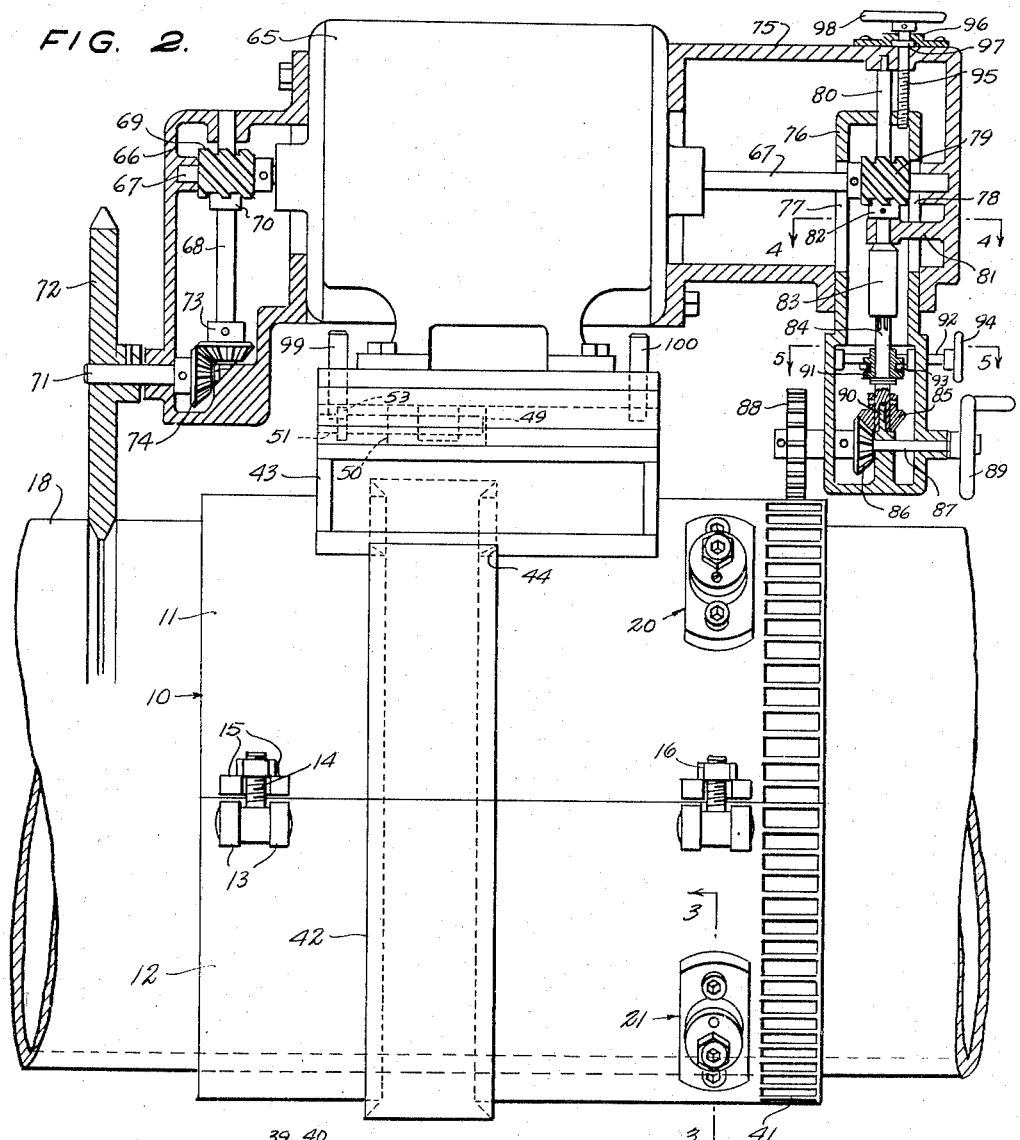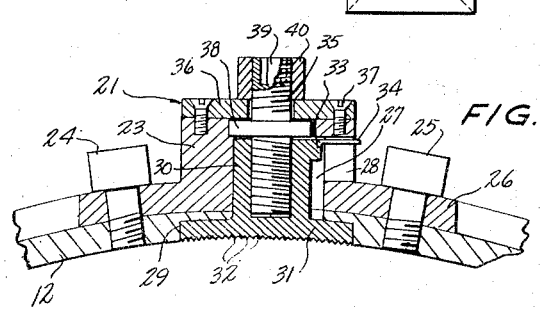

Patented July 24, 1951

2,561,484

UNITED STATES PATENT OFFICE 2,561,484

POWER-OPERATED PIPE-CUTTING TOOL

Albert W. Shaw, Russell J. Bullard, and Frank L. Claire, Taft, Calif.

Application August 23, 1949, Serial No. 111,912

6 Claims. (Cl. 90—12)

This invention relates to power-operated pipe cutting tools, and more particularly to a portable tool which can be mounted on the pipe in situ and power operated to cut the pipe at any desired location longitudinally thereof.

It is among the objects of the invention to provide an improved, portable, pipe cutting tool for cutting large pipe, such as that used in water, oil and gas mains, which tool is power operated and effective to sever the pipe in one continuous cut, can be driven by an electric air or fluid-pressure motor as may be convenient or desired, is rigidly mountable on a pipe section and fully adjustable to accurately position the cut longitudinally of the pipe section, carries its cutting tool in an easily accessible location, so that the cutting tool can be replaced whenever necessary, and which is simple and durable in construction, and easy to mount in operative position on a pipe section.

Other objects and advantages will become apparent from a consideration of the following description and the appended claims in conjunction with the accompanying drawings, wherein:

Figure 1 is a transverse cross-section of a pipe section showing in front-end elevation a pipe cutting tool illustrative of the invention operatively mounted on the pipe section;

Figure 2 is a side elevation of the cutting tool and a fragmentary portion of the pipe section, portions of the tool being broken away and shown in cross-section to better illustrate the construction thereof;

Figure 3 is a transverse cross-section on an enlarged scale of a fragmentary portion of the cutting tool and is taken substantially on the line 3—3 of Figure 2;

Figure 4 is a transverse cross-section of a fragmentary portion of the cutting tool taken on the line 4—4 of Figure 2;

Figure 5 is a transverse cross-section of a fragmentary portion of the tool taken on the line 5—5 of Figure 2; and Figure 6 is a somewhat diagrammatic view showing the operation of the cutting tool or saw in cutting a pipe section.

With continued reference to the drawings, the tool comprises a split, cylindrical sleeve, generally indicated at 10, and including two substantially semi-cylindrical parts 11 and 12.

The part 12 has pairs of apertured lugs 13 disposed near the respectively-opposite ends of its two longitudinal edges and a bolt 14 is pivotally connected at one end to these lugs and is receivable between respective pairs of lugs 15 carried by the part 11. Each bolt has a nut 16 threaded thereon which bears upon the associated lugs 15 to firmly clamp the two parts of the sleeve together. Suitable dowels 17 engaging in registering recesses provided in the longitudinal edges of the two parts 11 and 12 accurately position the two parts of the sleeve in assembled relationship.

The sleeve 10 is of a size to loosely receive a pipe section of predetermined diameter and different sleeves will be provided for different sizes of pipe sections. The sleeve 10 is centered on the pipe section 18 received therein by suitable jack devices which extend through the sleeve and engage the outer surface of the pipe section. In the arrangement illustrated there are four jack devices, as indicated generally at 19, 20, 21, and 22, two of which are mounted in the sleeve part 11, and the other two of which are mounted in the complementary sleeve part 12, the four devices being spaced apart at substantially equal angular intervals when the two sleeve parts are operatively assembled together. As these jack devices are all similar in construction and operation, a detailed illustration and description of only one is considered sufficient for the purposes of the present disclosure, and the device 21 has been selected for this purpose and is illustrated in detail in Figure 3.

The device 21 comprises a flanged boss 23 secured to the sleeve part 12 by stud bolts 24 and 25 extending through apertures provided in the curved flange 26 at respectively-opposite sides of the boss and threaded into screw-threaded apertures provided in the wall of the sleeve part 12. The boss 23 has a cylindrical aperture extending therethrough and a groove 27 is provided in one side of this aperture, a portion of which slot is extended entirely through the wall of the boss, as indicated at 28. The sleeve part 12 is provided with an aperture registering with the aperture in the boss and with a recess in its inner surface surrounding this aperture. A shoe 29 has a tubular, internally screw-threaded stem 30 slidably received in the apertures in the wall of the sleeve part 12 and in the boss 23, and a sole 31 receivable in the recess in the inner surface of the sleeve part, this sole being provided on its surface adjacent the pipe section with serrations 32 which engage the pipe section to hold the sleeve against rotation relative thereto. A lug 33 projects from the stem 30 of the shoe into the slot 27 to hold the shoe against rotation and a tongue 34 extends from this lug through the slot extension 28, so that the shoe can be manually moved to a position in which its sole 31 is received in the recess in the sleeve part. An externally screw-threaded stud 35 is threaded into the stem of the shoe and extends through an aperture provided in a cap plate 36 secured in overlying relationship to the outer end of the boss by suitable means, such as the cap screws 37. An annular collar 38 is provided on the stud at the inner side of the plate 36 to provide a bearing, so that the shoe will be forced inwardly of the sleeve part when the stud 35 is rotated in the proper direction, and a socket 39 of non-circular cross-sectional shape is provided in the outer end of the stud for the reception of a stud-turning tool. A lock nut 40 is threaded onto the stud at the outer side of the plate 36, so that the stud can be locked with the shoe 29 in adjusted position.

In applying the sleeve to a pipe section, the studs are first rotated to bring the soles of the several shoes into the corresponding recesses in the sleeve parts and the sleeve parts are then placed around the pipe section and secured together by the bolts 14 and nuts 16. The studs 35 are then rotated to force the respective shoes 29 inwardly into engagement with the outer surface of the pipe section, the rotation of the several studs being such as to substantially center the sleeve relative to the pipe section and, after the shoes are brought into firm engagement with the outer surface of the pipe section, the various studs are locked in position by the respective lock nuts 40. As the soles 31 of the shoes have a large area in contact with the pipe section, it has been found necessary to provide only one set of centering devices located near one end of the sleeve.

An annular gear 41 is provided around the sleeve between the centering devices and the adjacent end of the sleeve for a purpose which will presently appear.

A band 42 is provided around the sleeve near the mid-length location of the latter, this band formed in two parts, attached respectively to the two sleeve parts and so arranged that the ends of the band parts register when the sleeve parts are secured together in assembled relationship. The side edges of the band 42 are undercut so that the band constitutes a guide of dove-tail cross-sectional shape surrounding the sleeve A base 43 having a concave inner surface which fits the cylindrically-curved outer surface of the sleeve 10 and a flat, upper surface is mounted on the sleeve and has a guideway 44 extending across its inner, concave surface, which guideway receives the band 42, so that the band holes the base on the sleeve for movement circumferentially around the sleeve.

A plate 44 is secured on the upper or outer, flat surface of the base 43 and this plate 44 has formed thereon a guide 45 of dove-tailed cross-sectional shape positioned to extend longitudinally of the sleeve. A carriage, generally indicated at 46, has a flat portion 47 overlying the plate 44 and provided with a guideway which slidably receives the guide 45 and also has a portion 48 which extends away from the base 43 and is substantially perpendicular to the portion 47.

The guide 45 has therein an elongated, rectangular slot 49 and a rectangular nut 50 is slidable longitudinally in this slot and connected to the portion 47 of the carriage 46. A screw 51 is threaded through the nut 50 and extends through an apertured plate 52 secured on the plate 44 at the corresponding end of the guide 45. This screw has a shoulder 53 disposed between the plate 45 and the adjacent end of the guide, so that, when the screw is rotated the entire carriage will be moved in one direction or the other longitudinally of the sleeve 10 for a purpose to be presently described. The screw 51 is provided, in its outer end, with a socket of non-circular cross-section to receive a tool for rotating the screw.

An angle bracket, generally indicated at 55, has a flat, plate portion 56 overlying the portion 47 of the carriage 46, and a portion 57 disposed at right angles to the portion 56 and overlying the inner surface of the perpendicularly-extending portion 48 of the carriage. The portion 48 of the carriage is provided adjacent its mid-length location with a guide of dove-tailed cross-sectional shape extending perpendicular to the portion 47 of the carriage, and the portion 56 of the bracket is provided with a guideway which slidably receives the guide 58 on the carriage.

The guide 58 is provided with an elongated, rectangular slot 59 and a rectangular nut 60 is slidable longitudinally in this slot and attached to the portion 57 of the bracket. A screw 61 is threaded through the nut 60 and extends to the outer end of the carriage portion 48 where it is provided with a socket 62 of non-circular, cross-sectional shape to receive a screw rotating wrench or tool. An apertured plate 63 is secured to the portion 48 of the carriage at the outer end of the latter and receives the outer end of the screw 61. The screw is provided with an annular shoulder 64 disposed between the plate and the outer end of the carriage portion 48 to maintain the screw against longitudinal movement, so that the nut 60 will be moved longitudinally of the slot 59 when the screw is rotated. Rotation of the screw 61 will move the bracket 55 up or down relative to the carriage 46, and rotation of the screw 51 will move the carriage with the bracket thereon longitudinally of the base 43. The adjusting means for moving the carriage up and down or in and out relative to the sleeve and for moving the bracket up and down, or in and out relative to the sleeve and for moving the carriage and bracket longitudinally of the sleeve are similar in construction and operation and both are manually operated by means of a suitable wrench or hand tool.

A motor 65 is rigidly mounted on the portion 56 of the bracket 55 and may be either an electric or a fluid pressure-operated motor, as may be found convenient or desirable.

A gear housing 66 is secured to one end of the motor, and the corresponding end of the motor shaft 67 is journaled in this housing. A transmission shaft 68 is also journaled in the housing 66 and is disposed perpendicular to the motor shaft 67, and a worm 69 on the motor shaft meshes with a worm gear 70 on the transmission shaft 68 to rotate the transmission shaft when the motor is in operation.

A stub shaft 71 is journaled in the housing 66 at the end of the transmission shaft 68 opposite that adjacent which the worm gear 70 is secured, and this shaft projects out of the housing 66 to receive a circular cutting tool 72. Within the housing 66 a beveled gear 73 is secured on the shaft 68 and a beveled gear 74 is secured on the stub shaft 71 and meshes with the beveled gear 73, so that the stub shaft 71 and the cutting tool 72 will be rotated when the shaft 68 is rotated by the motor to provide a power drive for the cutting tool.

In order to provide an automatic feed for the cutting tool, a hollow housing 75 is secured on the opposite end of the motor 65 and an auxiliary hollow housing 76 is slidably mounted in the housing 75. The motor shaft 67 is journaled in the housing 75 and extends through elongated slots 77 and 78 in the opposite side walls of the slidable housing 76, and a worm 79 is provided on the motor shaft within the housing 76. A transmission shaft 80 extends through the slidable housing 76 and is journaled at its outer end in the housing 75 and intermediate its length in an apertured tongue 81 which extends from the outer end wall of the housing 75 into the housing 76 through the slot 78, and a worm gear 82 is provided on the shaft 78 meshing with the worm 79 on the motor shaft, so that the shaft 80 will be rotated when the motor is in operation.

At the side of the apertured tongue 81 opposite the worm gear 82 the shaft 80 is provided with an elongated, internally-splined sleeve 83, and a splined shaft 84 journaled in the slidable housing 76 is slidably received at one end in the sleeve 83. A beveled gear 85 is secured on the opposite end of the shaft 84 and meshes with a beveled gear 86 secured on a shaft 87 which is journaled in the slidable housing 76 near the inner end of the latter and is disposed substantially perpendicular to the shaft 84, so that the shaft 87 will be driven from the motor through the shafts 80 and 84.

The shaft 87 projects out of the housing 76 at both ends, and a spur gear 88 is secured on this shaft at one end thereof and meshes with the gear 41 provided on the sleeve, while a handwheel 89 is secured on the opposite end of the shaft 87.

The shaft 84 is journaled at its lower or inner end in the housing 76 by suitable means, such as the pin 90 projecting into a well in the end of the shaft, so that the shaft 84 is longitudinally movable in the housing. A collar 91 having an annular, external groove therein is secured on the shaft 84 intermediate the length of the latter, and a shaft 92 extends through the housing 76 adjacent the collar 91. A fork 93 secured on the shaft 92 engages in the groove of the collar 91 and a handwheel 94 is secured on the shaft 92 outside of the housing 76, so that by rotation of the handwheel the shaft 84 is moved longitudinally in the housing to move the beveled gear 85 out of mesh with the beveled gear 86. When the beveled gears 85 and 86 are out of mesh, the device can be hand fed by rotating the handwheel 89, causing the spur gear 88 to walk around the sleeve gear 41. When the beveled gears 85 and 86 are in mesh, the feed is automatically provided by the motor 65 in the manner indicated above, the motor rotating the shaft 87 and gear 88 and causing the gear 88 to walk around the sleeve gear 41. The gear reduction between the motor shaft 67 and the sleeve gear 41 is such that the cutting tool 72 will be fed around the pipe section 10 at the proper speed.

A screw shaft 95 extends through the outer wall of the housing 75 and is threaded into a screw-threaded aperture provided in the adjacent wall of the slidable housing 76. A recessed, apertured plate 96 is secured to the housing 75 surrounding the screw shaft 95 and the screw shaft has thereon an annular collar 97 disposed between the plate 96 and the adjacent outer surface of the housing 75 to restrain the screw shaft against longitudinal movement relative to the housing 75. A handwheel 98 is secured on the screw shaft 95 outside of the housing 75 for manually rotating the screw shaft. This screw shaft is operative to move the housing 76 slidably in the housing 75 to move the gear 88 into and out of mesh with the gear 41. In setting up the cutting machine on a pipe section the gear 88 is maintained out of mesh with the gear 41 until the sleeve 10 is locked in place and the proper adjustments obtained, after which the screw shaft 95 is rotated by the handwheel 98 to bring the gear 88 into full mesh with the gear 41 and thus provide a drive feed for the cutting tool.

After the location of a cut longitudinally of the pipe section has been determined, the sleeve 10 is secured on the pipe section adjacent the location of the cut with the cutting tool 72 out of contact with the pipe section. The screw 51 is then turned to bring the cutting tool to the exact location of the desired cut, and the motor 65 is then placed in operation. With the motor in operation the screw 61 is turned in a direction to move the cutting tool radially inward of the pipe section until the tool has cut entirely through the wall of the pipe section, this part of the operation being performed with the gear 88 out of mesh with the gear 41. Operation of the motor may now be temporarily discontinued while the gear 88 is brought into mesh with the gear 41 and then resumed, whereupon the cutting tool will be fed circumferentially around the pipe section, making a circumferential cut to sever the pipe section at the desired location. If the cutting tool should stick or jam, the bevel gears 85 and 86 can be moved out of mesh and the tool backed up by the hand-feed wheel 89 and brought slowly into contact with the work until the binding has been overcome.

It will be noted that the gear 41 is much wider than the gear 88 providing for longitudinal adjustment of the motor, cutting tool and feed assembly longitudinally of the sleeve 10 by the screw 51, and that the spline connection between the shafts 80 and 84 permits freedom of movement of the motor, cutting tool and feed assembly radially inward and outward relative to the pipe section.

The cutting tool 72 is preferably a relatively thick disc having peripheral teeth, the side surfaces of which are convergently inclined in a radially-outward direction, so that the end of the pipe section at the cut is properly beveled at the same time the cut is made.

A pair of guide dowels 99 and 100 are secured in the part 47 of the carriage 46 near the edge of the part 47 opposite the part 48 and these guide dowels extend slidably through apertures provided in the part 56 of the bracket 55 to guide the edge of the bracket remote from the guideway 58 in the movements of the bracket toward and away from the base-engaging portion 47 of the carriage.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A portable, power-operated pipe cutting tool comprising a diametrically split sleeve of a size to surround a pipe section, means carried by the two parts of said sleeve for securing such parts together in pipe-surrounding relationship, means carried by said sleeve for supporting the latter in centered position relative to a pipe section received therein, a band on said sleeve having its opposite edges undercut to provide a guide of dove-tailed cross-sectional shape, a base on said sleeve having a guideway therein slidably receiving said band, a guide on the side of said base opposite said guideway and extending longitudinally of said sleeve, a carriage slidably mounted on said base and including a portion overlying said base and engaging said guide and a portion extending perpendicular to said base and longitudinally of said sleeve, said perpendicularly-extending carriage portion having a guide thereon disposed substantially perpendicular to said base, a motor bracket having a portion overlying the perpendicularly-extending portion of said carriage and provided with a guideway slidably receiving said carriage guide, a motor secured to said bracket, a gear unit secured to one end of said motor and including a cutting tool arbor, a cutting tool on said arbor, manually-operated adjusting means connected between said base and said carriage for moving said cutting tool longitudinally of a pipe section received in said sleeve, manually-operated adjusting means connected between said bracket and said perpendicularly-extending carriage portion to move said cutting tool substantially radially of such pipe section, and feed means carried by said motor and said sleeve and driven by said motor to carry said motor and said cutting tool around said sleeve.

2. A portable, power-operated pipe cutting tool comprising a diametrically split, two-part sleeve, means carried by the two parts of said sleeve for rigidly securing such two parts together in surrounding relationship to a pipe section, means carried by the sleeve parts for firmly holding the sleeve in substantially centered relationship on a pipe section received therein, a motor-supporting bracket, a motor mounted on said bracket, means connected between said bracket and said sleeve for guiding said bracket circumferentially around said sleeve, longitudinally of said sleeve and toward and away from said sleeve, manually-operated adjusting means connected between said bracket and said sleeve for adjustably moving said bracket longitudinally of said sleeve and toward and away from said sleeve, combined motor driven and manually-operated feed means connected between said motor and said sleeve for moving said motor and said bracket circumferentially around said sleeve, and a motor-driven cutting tool assembly carried by said motor for cutting a pipe section received in said sleeve, said combined motor-driven and manually-operated feed means comprising a hollow main housing secured to said motor at one end thereof, a motor shaft extending through and journaled in said housing, an auxiliary housing slidable in said main housing, a first shaft journaled in said main housing and disposed substantially at right angles to said motor shaft, a worm and gear driving connection between said motor shaft and said first shaft, a second shaft journaled in said auxiliary housing in longitudinal alignment with said first shaft, a slidable, torque transmitting connection between said first and second shafts, a third shaft journaled in said auxiliary housing spaced from said motor shaft and substantially perpendicular to said second shaft, a beveled gear drive connection between said second and third shafts, a circumferential gear on said sleeve, a spur gear on said third shaft meshing with said circumferential gear, manually-operated means carried by said auxiliary housing and engaging said second shaft to uncouple said beveled gear drive connection, and a handwheel on said third shaft at the end of the latter opposite said spur gear.

3. A portable, power-operated pipe cutting tool comprising a diametrically split, two-part sleeve, means carried by the two parts of said sleeve for rigidly securing such two parts together in surrounding relationship to a pipe section, means carried by the sleeve parts for firmly holding the sleeve in substantially centered relationship on a pipe section received therein, a motor-supporting bracket, a motor mounted on said bracket, means connected between said bracket and said sleeve for guiding said bracket circumferentially around said sleeve, longitudinally of said sleeve and toward and away from said sleeve, manually-operated adjusting means connected between said bracket and said sleeve for adjustably moving said bracket longitudinally of said sleeve and toward and away from said sleeve, combined motor-driven and manually-operated feed means connected between said motor and said sleeve for moving said motor and said bracket circumferentially around said sleeve, and a motor-driven cutting tool assembly carried by said motor for cutting a pipe section received in said sleeve, said combined motor-driven and manually-operated feed means comprising a hollow main housing secured to said motor at one end thereof, a motor shaft extending through and journaled in said housing, an auxiliary housing slidable in said main housing, a first shaft journaled in said main housing and disposed substantially at right angles to said motor shaft, a worm and gear driving connection between said motor shaft and said first shaft, a second shaft journaled in said auxiliary housing in longitudinal alignment with said first shaft, a slidable, torque transmitting connection between said first and second shafts, a third shaft journaled in said auxiliary housing spaced from said motor shaft and substantially perpendicular to said second shaft, a beveled gear drive connection between said second and third shafts, a circumferential gear on said sleeve, a spur gear on said third shaft meshing with said circumferential gear, manually-operated means carried by said auxiliary housing and engaging said second shaft to uncouple said beveled gear drive connection, a handwheel on said third shaft at the end of the latter opposite said spur gear, and manually-operated means carried by said main housing and engaging said auxiliary housing for moving said auxiliary housing to move said spur gear into and out of mesh with said circumferential gear.

4. A portable, power-operated pipe cutting tool comprising a diametrically split, two-part sleeve, means carried by the two parts of said sleeve for rigidly securing such two parts together in surrounding relationship to a pipe section, means carried by the sleeve parts for firmly holding the sleeve in substantially centered relationship on a pipe section received therein, a motor-supporting bracket, a motor mounted on said bracket, means connected between said bracket and said sleeve for guiding said bracket circumferentially around said sleeve, longitudinally of said sleeve and toward and away from said sleeve, manually-operated adjusting means connected between said bracket and said sleeve for adjustably moving said bracket longitudinally of said sleeve and toward and away from said sleeve, combined motor driven and manually-operated feed means connected between said motor and said sleeve for moving said motor and said bracket circumferentially around said sleeve, and a motor-driven cutting tool assembly carried by said motor for cutting a pipe section received in said sleeve, said combined motor-driven and manually-operated feed means comprising a hollow main housing secured to said motor at one end thereof, a motor shaft extending through and journaled in said housing, an auxiliary housing slidable in said main housing, a first shaft journaled in said main housing and disposed substantially at right angles to said motor shaft, a worm and gear driving connection between said motor shaft and said first shaft, a second shaft journaled in said auxiliary housing in longitudinal alignment with said first shaft, a slidable, torque transmitting connection between said first and second shafts, a third shaft journaled in said auxiliary housing spaced from said motor shaft and substantially perpendicular to said second shaft, a beveled gear drive connection between said second and third shafts, a circumferential gear on said sleeve, a spur gear on said third shaft meshing with said circumferential gear, manually-operated means carried by said auxiliary housing and engaging said second shaft to uncouple said beveled gear drive connection, and a handwheel on said third shaft at the end of the latter opposite said spur gear, said circumferential gear and said spur gear being of different widths to permit movement of said motor longitudinally of said sleeve without bringing said circumferential and spur gears out of mesh with each other.

5. In a cutting tool assembly for cutting a pipe section, a mounting sleeve for said assembly engageable concentrically on the pipe section; and means for holding said sleeve in substantially centered relationship on the pipe section, said means including a plurality of units spaced at substantially equal angular intervals around said sleeve, each of said units including an apertured boss secured to said sleeve and having a groove formed in the aperture thereof, a shoe having a hollow, internally screw-threaded stem slidably received in said boss and provided with a lug slidable in the boss groove to maintain the shoe against rotation relative to the boss, and a flat sole at one end of the stem engageable with the outer surface of a pipe section received in the sleeve, a screw member threaded into said stem and having an annular shoulder thereon, and an apertured plate receiving said screw member and secured to the outer end of said boss to hold the shoulder of the screw member against the outer end of the boss and prevent longitudinal movement of said screw member relative to said boss.

6. A portable, power-operated pipe cutting tool comprising a diametrically split sleeve adapted to be circumposed on a pipe section, means carried by the two parts of said sleeve for securing said parts together in pipe surrounding relationship, means carried by said sleeve for supporting the sleeve in centered position relative to a pipe section received therein, trackways circumposed on said sleeve, a base member, means slidably mounting said base member in said trackways, a guide on the side of said base member disposed longitudinally of said sleeve, a carriage slidably mounted on said base member and including a portion engaging said guide and a portion extending perpendicular to said base member and longitudinally of said sleeve, said perpendicularly extending portion of the carriage having a guide thereon disposed perpendicular to said base, a motor bracket having a portion overlying the perpendicularly extending portion of said carriage and provided with a guideway slidably receiving said carriage guide, a motor mounted on the bracket, gearing operatively connected to the motor and including a cutting tool arbor for operatively supporting a cutting tool, manually operated adjusting means connected between said base member and said carriage for moving said arbor, to move a cutting tool mounted thereon longitudinally of a pipe section received in said sleeve, manually operated adjusting means connected between said bracket and said perpendicularly extending carriage portion to move said arbor in a direction so that a cutting tool carried by the arbor is moved substantially radially of said pipe section, and feed means carried by said motor and said sleeve and driven by said motor for carrying said motor and the arbor, with a cutting tool thereon, around said sleeve.

ALBERT W. SHAW.
RUSSELL J. BULLARD.
FRANK L. CLAIRE.

REFERENCES CITED

The following references are of record in the file of this patent:

UNITED STATES PATENTS

| Number | Name | Date |
| --- | --- | --- |
| 1,932,462 | Howlett | Oct. 31, 1933 |
| 1,985,541 | Hoeffer | Dec. 25, 1934 |
| 2,159,287 | Morgan | May 23, 1939 |
| 2,291,395 | Levey | July 28, 1942 |

FOREIGN PATENTS

| Number | Country | Date |
| --- | --- | --- |
| 272,032 | Germany | Mar. 25, 1914 |